US011951704B2

(12) United States Patent
Yamazaki

(10) Patent No.: US 11,951,704 B2
(45) Date of Patent: Apr. 9, 2024

(54) PRESS DEVICE, PRESS SYSTEM, METHOD FOR CONTROLLING PRESS DEVICE, AND MOTION CREATION DEVICE

(71) Applicant: KOMATSU INDUSTRIES CORPORATION, Kanazawa (JP)

(72) Inventor: Koyo Yamazaki, Ishikawa (JP)

(73) Assignee: KOMATSU INDUSTRIES CORPORATION, Ishikawa (JP)

(*) Notice: Subject to any disclaimer, the term of this patent is extended or adjusted under 35 U.S.C. 154(b) by 372 days.

(21) Appl. No.: 17/292,143

(22) PCT Filed: Jan. 17, 2020

(86) PCT No.: PCT/JP2020/001520
§ 371 (c)(1),
(2) Date: May 7, 2021

(87) PCT Pub. No.: WO2020/166277
PCT Pub. Date: Aug. 20, 2020

(65) Prior Publication Data

US 2021/0394477 A1 Dec. 23, 2021

(30) Foreign Application Priority Data

Feb. 12, 2019 (JP) ................................ 2019-022924

(51) Int. Cl.
*B30B 15/14* (2006.01)
*B30B 15/26* (2006.01)
*B30B 15/28* (2006.01)

(52) U.S. Cl.
CPC ............ *B30B 15/148* (2013.01); *B30B 15/26* (2013.01); *B30B 15/28* (2013.01)

(58) Field of Classification Search
CPC ..... B30B 15/142; B30B 15/148; B30B 15/26; B30B 15/28; B30B 15/285; B30B 11/005
See application file for complete search history.

(56) References Cited

U.S. PATENT DOCUMENTS

2013/0104613 A1 5/2013 Kaneko et al.
2016/0243780 A1* 8/2016 Suzuki .................... B30B 15/26

FOREIGN PATENT DOCUMENTS

EP 2329943 A2 * 6/2011 ............. B23Q 15/18
JP 9-285819 A 11/1997

(Continued)

OTHER PUBLICATIONS

The International Search Report for the corresponding international application No. PCT/JP2020/001520, dated Mar. 31, 2020.

*Primary Examiner* — Jimmy T Nguyen
(74) *Attorney, Agent, or Firm* — Global IP Counselors, LLP

(57) ABSTRACT

The press device is a press device configured to press a workpiece, and includes a slide, a bolster, a servomotor, and a control section. The slide is movable. The bolster is placed to face the slide. The servomotor drives the slide. The control section is configured to be able to execute selectively either the productivity priority mode of setting a limit value slower than the maximum press speed of the press device to the press speed when performing a pendulum motion or a reverse motion, or the moldability priority mode of setting a stop time to the servomotor without setting the limit value.

13 Claims, 14 Drawing Sheets

(56) References Cited

FOREIGN PATENT DOCUMENTS

| | | | | | |
|---|---|---|---|---|---|
| JP | 2004-17098 | A | | 1/2004 | |
| JP | 2005-21934 | A | | 1/2005 | |
| JP | 2006-26657 | A | | 2/2006 | |
| JP | 2009172648 | A | * | 8/2009 | ........... B30B 15/148 |
| JP | 2013-91078 | A | | 5/2013 | |
| JP | 2013-212516 | A | | 10/2013 | |

* cited by examiner

PRESS DEVICE, PRESS SYSTEM, METHOD FOR CONTROLLING PRESS DEVICE, AND MOTION CREATION DEVICE

CROSS-REFERENCE TO RELATED APPLICATIONS

This application is a U.S. National stage application of International Application No. PCT/JP2020/001520, filed on Jan. 17, 2020. This U.S. National stage application claims priority under 35 U.S.C. § 119(a) to Japanese Patent Application No. 2019-022924, filed in Japan on Feb. 12, 2019, the entire contents of which are hereby incorporated herein by reference.

BACKGROUND

The present invention particularly relates to a press device using a servomotor, a press system, a method for controlling the press device, a program, and a motion creation device.

BACKGROUND INFORMATION

In recent years, a press device using a servomotor has been used as a press device. A feature of such a press device is that various slide motions can be set (see, for example, Japanese Patent laid-open No. 2004-17098).

In the mechanical press device before the servo press device, press working was performed by rotational motion, but in the servo press device, various motions such as rotational motion, pendulum motion, and reverse motion are possible. In the pendulum motion and the reverse motion, the time of one cycle can be shortened as compared with the rotational motion by setting a stroke height short, so that the productivity can be improved.

SUMMARY

On the other hand, since dies are expensive, it is desired to ensure the compatibility of dies between, for example, a mechanical press device in which a servomotor is not used and a servopress device.

However, when the difference in motion has a large effect on the molding accuracy, it is desirable to execute the movement along the rotational motion even in the pendulum motion of the servo press device, but depending on the setting of the slide height, the maximum SPM (Stroke Per Minute) in the specifications of the press device may be exceeded and the device may be damaged.

On the other hand, when the difference in motion has a small effect on the molding accuracy, it is not necessary to execute the movement along the rotational motion in the pendulum motion. When the movement is performed along the rotational motion, the acceleration/deceleration of the servomotor increases, and the power consumption increases on the contrary.

An object of the present invention is to provide a press device, a press system, a method for controlling the press device, and a program capable of saving energy or ensuring molding accuracy according to a user's request.

A press device according to the first invention is a press device configured to press a workpiece using an upper die and a lower die, and includes a slide, a bolster, a servomotor, and a control section. The slides are movable. The bolster is placed facing the slide. The servomotor drives the slide. The control section is configured to be able to execute selectively either a first mode of setting a limit value slower than a maximum press speed of the press device to a press speed when performing a pendulum motion or a reverse motion, or a second mode of setting first stop time to the servomotor without setting the limit value.

A press system according to the second invention includes a press device main body and a control device. The press device main body has a slide, a bolster, and a servomotor. The slides are movable. The bolster is placed facing the slide. The servomotor drives the slide. The control device is configured to be able to execute selectively either a first mode of setting a limit value slower than a maximum press speed of the press device main body to a press speed when performing a pendulum motion or a reverse motion, or a second mode of setting first stop time to the servomotor without setting the limit value.

A method for controlling a press device according to the third invention is a method for controlling the press device configured to drive a slide by a servomotor, and includes a control step. The control step selectively executes either a first mode of setting a limit value slower than a maximum press speed of the press device to a press speed when performing a pendulum motion or a reverse motion, or a second mode of setting first stop time to the servomotor without setting the limit value.

A program according to the fourth invention is a program for controlling a press device configured to drive a slide by a servomotor, causes a computer to execute a control step that selectively executes either a first mode of setting a limit value slower than a maximum press speed of the press device to a press speed when performing a pendulum motion or a reverse motion, or a second mode of setting first stop time to the servomotor without setting the limit value.

The motion creation device according to the fifth invention is a motion creation device for creating a motion for causing a press device to execute a pendulum motion or a reverse motion, and includes a selection section and a motion creation section. The selection section selects either the first mode or the second mode in the pendulum motion or the inversion motion. When the first mode is selected, the motion creation section creates a motion of setting a limit value slower than a maximum press speed of the press device to a press speed, and when the second mode is selected, the motion creation section creates a motion of setting first stop time to the servomotor without setting the limit value.

According to the present invention, it is possible to provide a press device, a press system, a method for controlling the press device, a program, and a motion creating device capable of saving energy or ensuring molding accuracy according to a user's request.

DESCRIPTION OF EMBODIMENTS

The following is an explanation of a press device 1 according to the embodiment of the present invention with reference to the drawings.

<1. Configuration>

(1-1. Outline of Appearance of Press Device)

Figure 1:
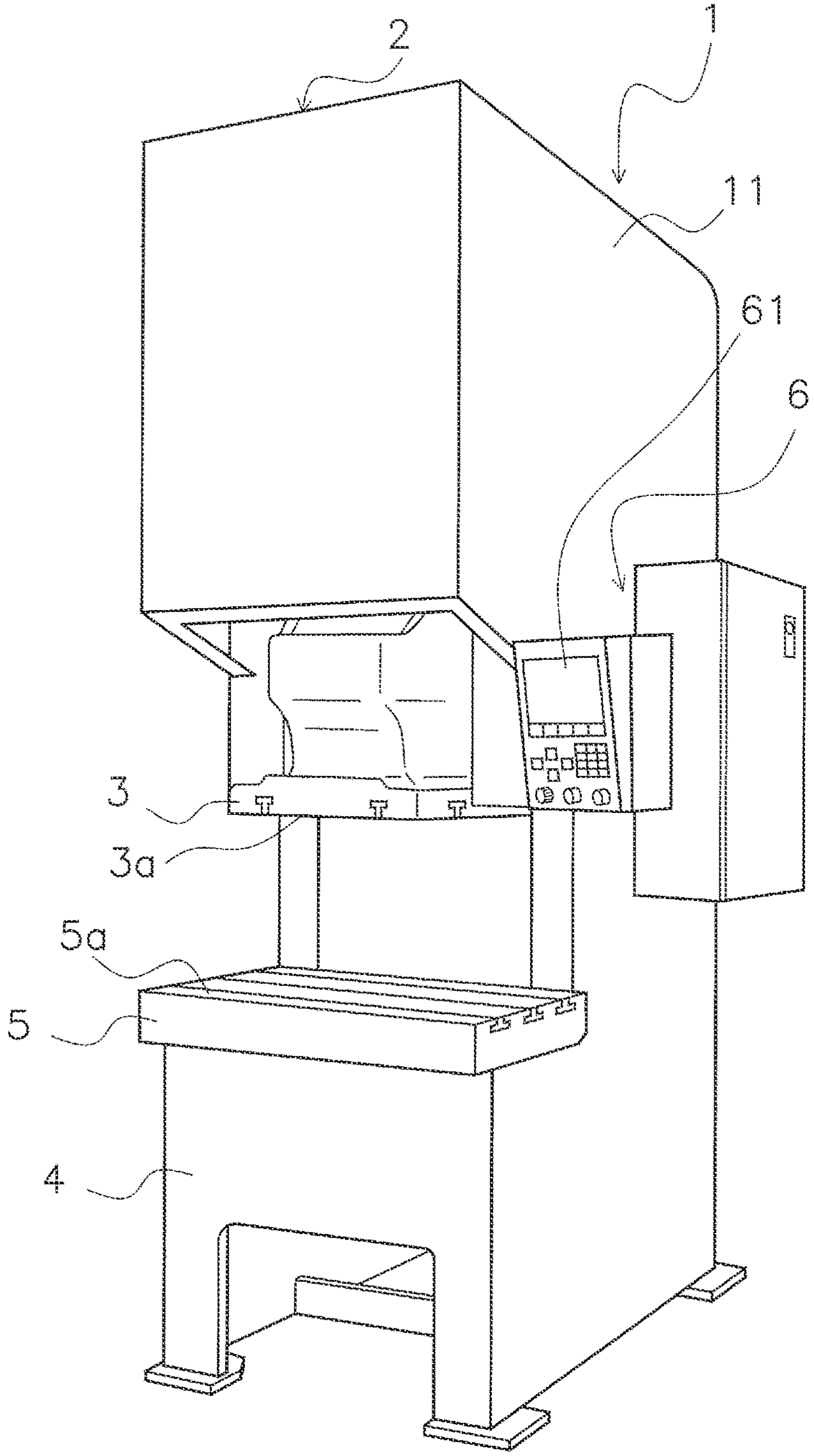
FIG. 1 is a view illustrating an appearance of a press device of an embodiment according to the present invention.

FIG. 1 is a perspective view illustrating an entire outline of the press device 1 according to the embodiment of the present invention.

The press device 1 of the present embodiment is a servo press device using a servomotor.

The press device 1 includes a main body frame 2, a slide 3, a bed 4, a bolster 5, and a control device 6.

As illustrated in FIG. 1, a slide 3 is supported so as to be vertically movable in substantially the center of the main body frame 2 of the press device 1. An upper die is attached to a lower surface 3*a* of the slide 3. A bolster 5 is provided below the slide 3 so as to face each other. The bolster 5 is fixed on the bed 4. The lower die is placed on an upper surface 5*a* of the bolster 5.

The control device 6 is provided on the side of a side frame 11 of the main body frame 2. The control device 6 is provided with a control panel 61 and the like for the operator to set the operation and the like.

(1-2. Configuration of Press Equipment)

Figure 2:
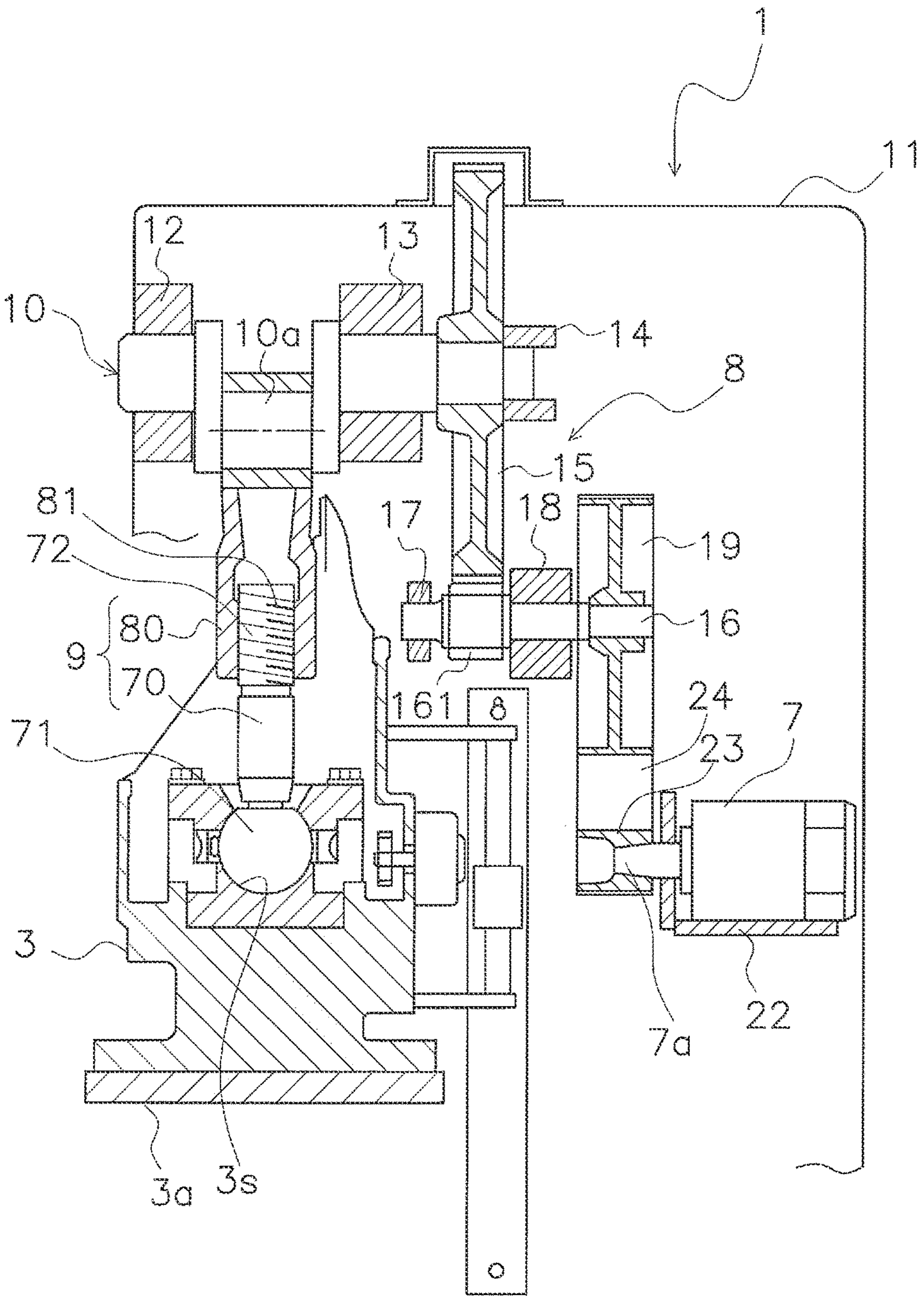
FIG. 2 is a side view illustrating an internal configuration of the press device illustrated in FIG. 1.

FIG. 2 is a view illustrating an internal configuration of the press device 1. As illustrated in the figure, the press device 1 includes a servomotor 7 and a transmission mechanism 8. The servomotor 7 drives the slide 3 up and down. The transmission mechanism 8 transmits the power of the servomotor 7 to the slide 3 and move the slide 3 in the vertical direction.

(1-2-1. Transmission Mechanism 8)

The transmission mechanism 8 mainly includes a connecting rod 9, a main shaft 10, a main gear 15, and a power transmission shaft 16.

The connecting rod 9 has a connecting rod main body 80 and a screw shaft 70 for adjusting the die height. A spherical part 71 is provided at a lower end of the screw shaft 70, and is rotatably inserted into a spherical hole 3*s* provided at an upper part of the slide 3. In this way, the spherical joint is formed by the spherical hole 3*s* and the spherical part 71. An upper part of the screw shaft 70 is exposed upward from the slide 3, and a screw part 72 is formed on the upper part of the screw shaft 70. The screw part 72 is screwed into a female screw part 81 of the connecting rod main body 80. As described above, the connecting rod 9 is flexibly configured by the screw shaft 70 and the connecting rod main body 80.

The main shaft 10 is provided at an upper part of the connecting rod 9. The upper part of the connecting rod 9 is rotatably connected to a crank-shaped eccentric part 10*a* provided on the main shaft 10. The main shaft 10 is arranged along the front-rear direction. The main shaft 10 is supported by three bearing portions 12, 13 and 14 arranged in the front-rear direction between a pair of left and right plate-shaped side frames 11 constituting the main body frame 2. The eccentric part 10*a* is provided between the bearing part 12 and the bearing part 13.

The main gear 15 is attached between the bearing part 13 and the bearing part 14 of the main shaft 10.

The power transmission shaft 16 is provided below the main gear 15. The power transmission shaft 16 is arranged along the front-rear direction, and is rotatably supported by bearing portions 17 and 18 provided at two front and rear positions. A gear 161 is provided between the bearing part 17 and the bearing part 18 of the power transmission shaft 16, and the gear 161 meshes with the main gear 15. Further, a pulley 19 is provided at the rear end of the power transmission shaft 16.

(1-2-2. Servomotor 7)

The servomotor 7 is supported between the side frames 11 by the bracket 22. The output shaft 7*a* of the servomotor 7 is arranged along the front-rear direction. A belt 24 is wound between the pulley 19 and a pulley 23 provided on the output shaft 7*a*. The rotation of the servomotor 7 is transmitted to the main gear 15 by the belt 24.

(1-3. Configuration of Control Device)

Figure 3:
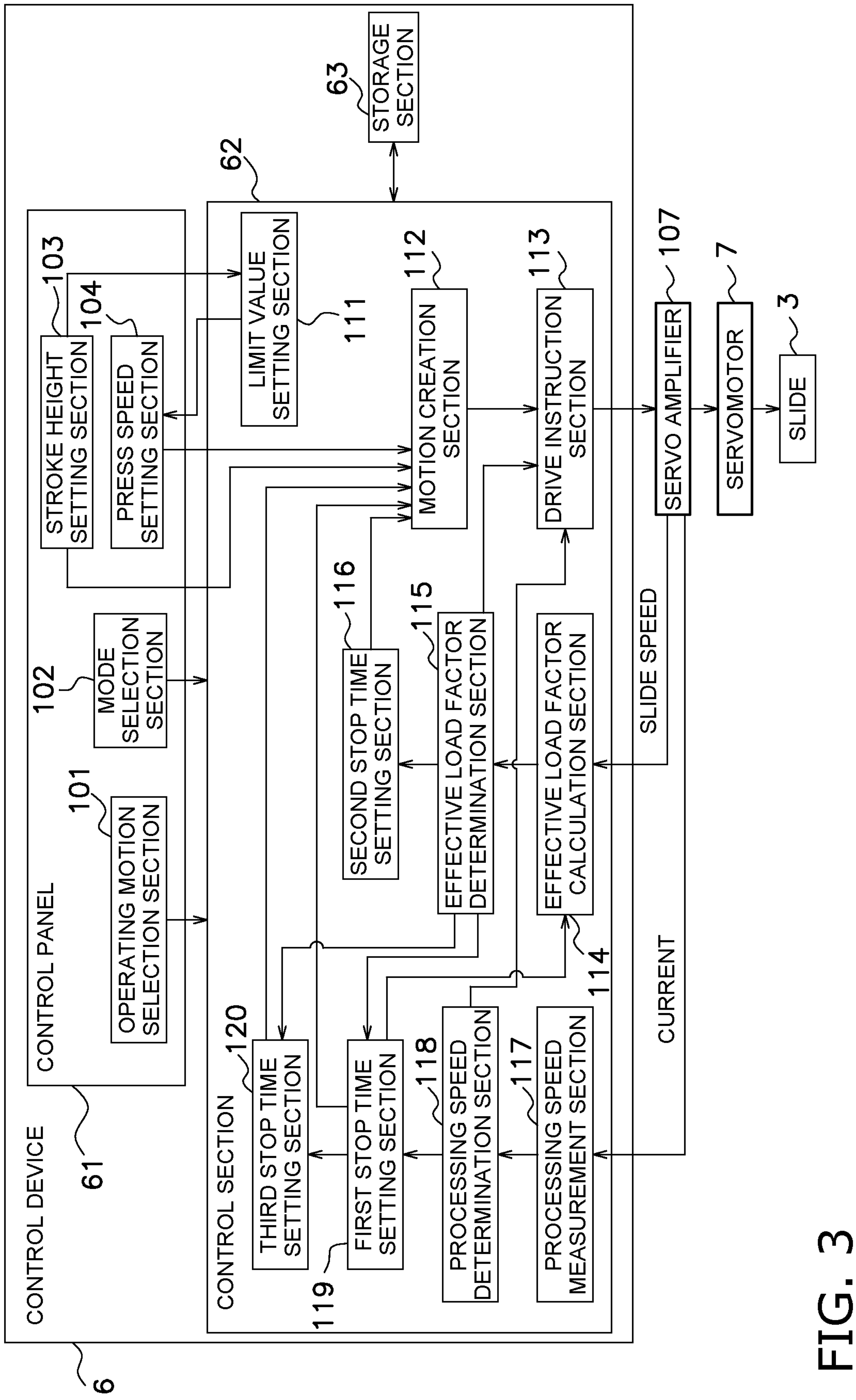
FIG. 3 is a view illustrating a configuration of a control device of the press device illustrated in FIG. 1.

FIG. 3 is a block diagram illustrating a configuration of the control device 6 of the press device 1 of the present embodiment. The control device 6 includes a control panel 61, a control section 62, and a storage section 63.

(1-3-1. Control Panel 61)

The control panel 61 is composed of a liquid crystal screen, a keyboard, and the like, and has an operating motion selection section 101, a mode selection section 102, a stroke height setting section 103, and a press speed setting section 104.

The operating motion selection section 101 is a switch for selecting an operating motion of the press device 1, and can be displayed on the liquid crystal screen, for example. As the operating motion, "rotational motion", "pendulum motion", "reverse motion" and the like can be selected.

Here, the "rotational motion" is a motion for rotating the rotation angle of the main shaft 10 from 0° to 360°. The "rotation motion" is a motion that rotates in one direction. The "rotational motion" includes a motion in which a predetermined angle is set as a standby point and the main shaft 10 is temporarily stopped at the standby point. The "pendulum motion" is, for example, a motion of reciprocating motion in the range of 80° (standby point) to 180°

(bottom dead center) to 280° (standby point), and is a motion of reciprocating through the bottom dead center. The "reverse motion" is a motion of reciprocating in the range of 0° to 180° or 180° to 360°, for example, a motion of reciprocating in the range of 30° (standby point) to 170° (standby point). The "reversal motion" is a motion in which the top dead center and the bottom dead center may be reached but not passed.

The mode selection section 102 is a switch that selects either "productivity priority mode" or "moldability priority mode" when "pendulum motion" or "reversal motion" is selected in the operating motion selection section 101. The mode selection section 102 can be displayed on the liquid crystal screen, for example.

In the "productivity priority mode", a limit is set on the speed that can be input in the press speed setting section 104, which will be described later, so as not to exceed the maximum SPM in the specifications.

The "productivity priority mode" is used, for example, when difference in motion (difference in motion in the machining area of the workpiece) has little influence on the moldability. For example, even when a die matched in a predetermined rotational motion is used in a pendulum motion or a reverse motion, the press speed can be changed if the difference in motion has little effect on moldability. Therefore, in the "productivity priority mode", by setting a limit on the press speed, acceleration/deceleration can be reduced, energy saving can be achieved, and production efficiency can be improved.

In the "moldability priority mode", the speed that can be input by the press speed setting section 104 is not limited, but the stop time is set in the servomotor 7 so as not to exceed the maximum SPM in the specifications.

The "moldability priority mode" is used, for example, when the difference in motion (difference in motion in the machining area of the workpiece) has a large influence on the moldability. For example, when a die matched in a predetermined rotation motion is used in a pendulum motion or a reverse motion, and the difference in motion has a large effect on moldability, it is necessary to match press speed with the rotational motion in which the die is matched. Therefore, in the "moldability priority mode", the press speed is not limited, but the standby time is set in the servomotor 7 in order to reduce the maximum SPM in the specifications.

The stroke height setting section 103 sets the stroke height of the slide in the "pendulum motion" or the "reversal motion". By setting the stroke height, the rotation angle of the main shaft 10 described above is set.

The press speed setting section 104 can input the press speed by the user. For example, the speed of the slide 3 in the rotational motion is set to 100%, and a ratio (%) with respect to 100% is input to the press speed setting section 104 as a desired press speed by the user. For example, when the press speed is set to 70%, the speed becomes 70% of the press speed of the rotary motion over the entire cycle, and the speed becomes slower. For example, in the present embodiment, the definition of the press speed of 100% is that the motor rotation speed (rpm) of the maximum SPM of the rotation motion in the press device specifications is 100%.

(1-3-2. Control Section 62)

The control section 62 can be configured by, for example, a CPU (Central Processing Unit) or the like.

As illustrated in FIG. 3, the control section 62 includes a limit value setting section 111, a motion creation section 112, a drive instruction section 113, an effective load factor calculation section 114, an effective load factor determination section 115, and a second stop time setting section 116, a processing speed measurement section 117, a processing speed determination section 118, a first stop time setting section 119, and a third stop time setting section 120.

(a. Limit Value Setting Section 111)

The limit value setting section 111 sets a limit value for the press speed that can be input to the press speed setting section 104 when the "productivity priority mode" is selected by the user. The limit value setting section 111 sets the limit value of the press speed based on the first information stored in the storage section 63.

Figure 4:
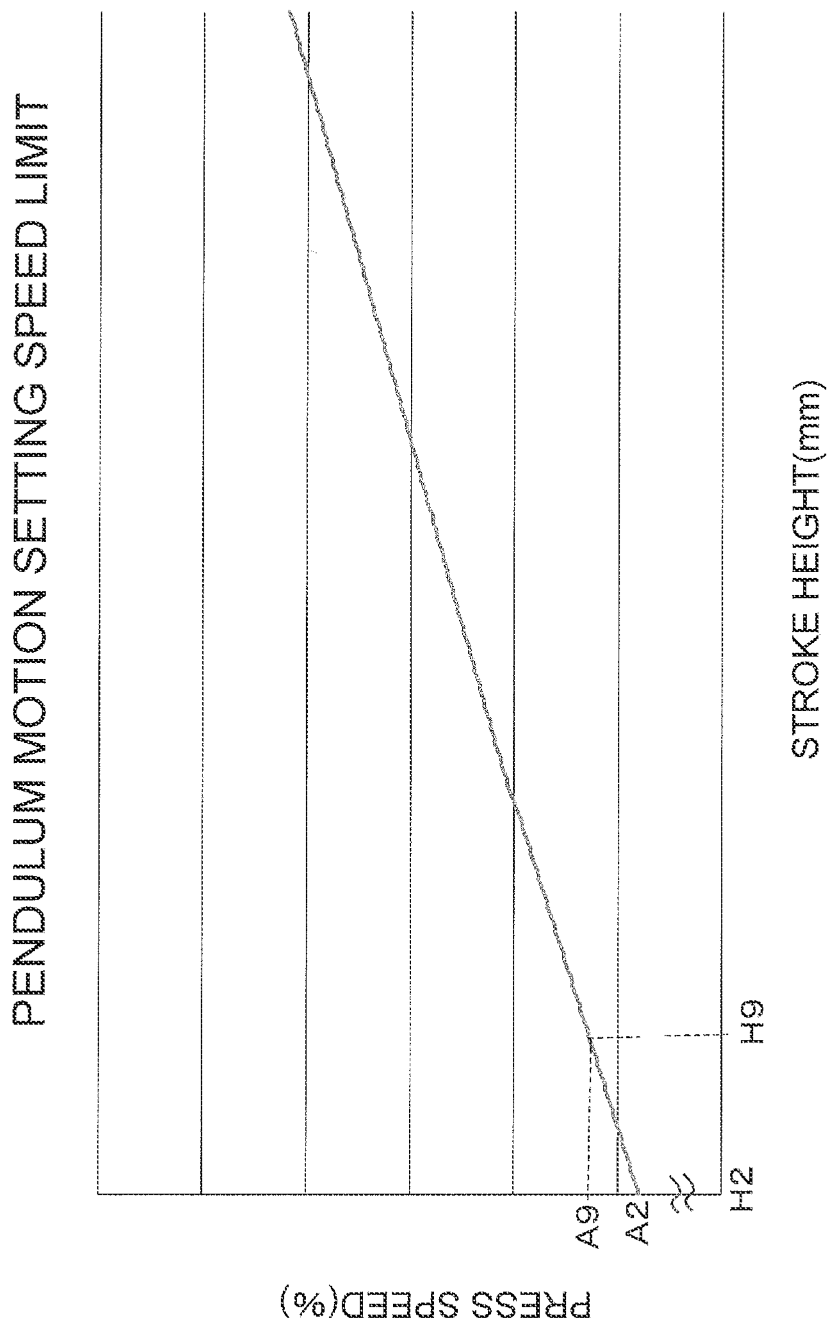
FIG. 4 is a diagram illustrating information of a relationship of a limit of a press speed with respect to a stroke height in a pendulum motion in the press device of FIG. 1

FIG. 4 is a view illustrating the first information. The first information illustrated in FIG. 4 is information illustrating the relationship between the limit value of the press speed and the stroke height in the pendulum motion. The first information is set for each press device, and may be further set for each die. The limit value of the press speed is a value that is the maximum SPM in the specifications of the press device 1. The maximum SPM in the specifications is the maximum value of the processing speed in the mechanical structure of the press device. The press speed, which can be said to be the speed of the slide, is determined by the rotation speed of the servomotor 7. Therefore, setting a limit value for the input of the press speed means setting a limit value for the maximum rotation speed of the servomotor 7.

The limit value setting section 111 acquires the limit value of the press speed from the stroke height input to the stroke height setting section 103 using the first information of FIG. 4, and sets a limit on the input value in the press speed setting section 104. For example, when the stroke height is input as H9 (mm), the limit value of the press speed is A9(%) in the first information. Therefore, the limit value setting section 111 sets a limit so that a value larger than A9(%) cannot be input to the press speed setting section 104, and the user can input a value of A9(%) or less.

(b. Motion Creation Section 112)

The motion creation section 112 creates a motion based on the stroke height input by the user in the stroke height setting section 103 and the press speed input by the user in the press speed setting section 104. The motion creation section 112 may create a motion by changing from the reference motion stored in the storage section 63. The reference motion may be a predetermined rotation motion, and a plurality of reference motions may be provided.

The function of the motion creation section 112 in the productivity priority mode will be described.

Figure 5:
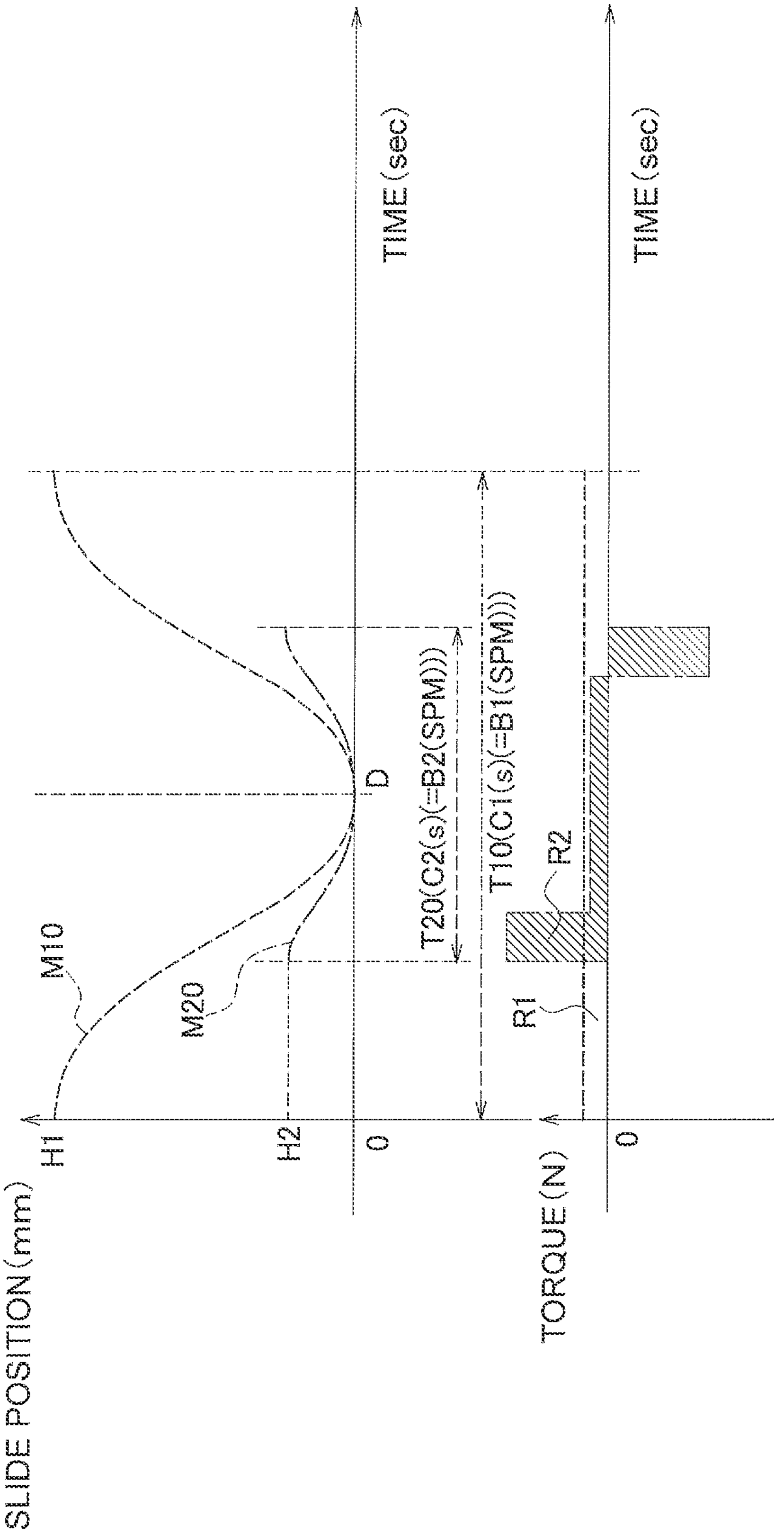
FIG. 5 is a view illustrating a motion which is an example of the rotation motion in the press device of FIG. 1, and a motion which is an example of the productivity priority mode in the pendulum motion.

FIG. 5 is a view illustrating a motion M10 which is an example of a rotation motion and a motion M20 which is an example of a productivity priority mode in a pendulum motion. FIG. 5 also illustrates the torque change in one cycle. The motion M10 illustrated in FIG. 5 shows, for example, a rotational motion in B1 (SPM) (1 cycle T10: C1 second) with a stroke height of H1 mm.

Figure 9:
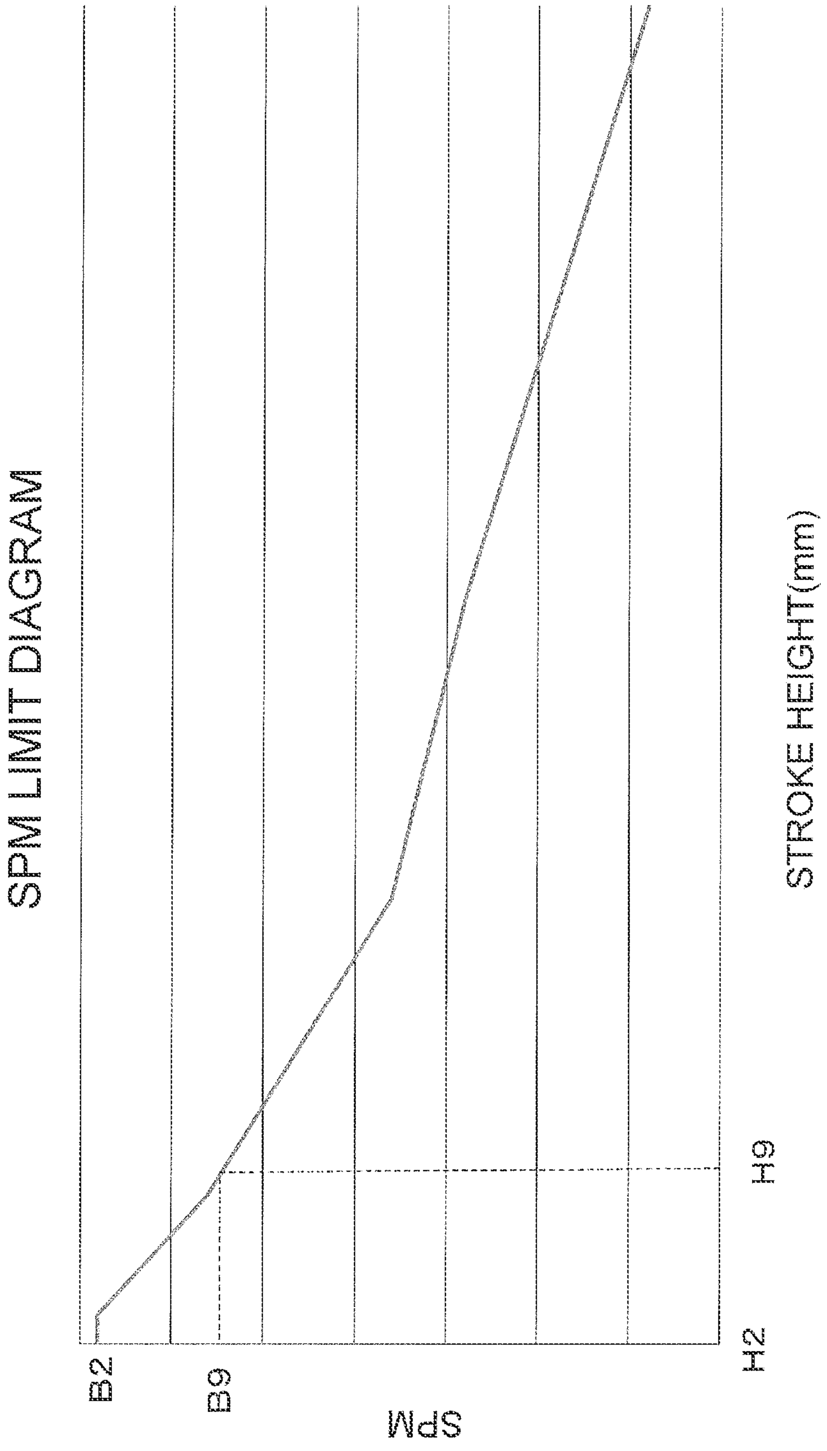
FIG. 9 is a diagram illustrating information which is a relationship of a limit value of SPM with respect to a stroke height in the press device of FIG. 1.

The motion M20 illustrated in FIG. 5 shows, for example, the motion of the productivity priority mode in the pendulum motion when the stroke height is set to H2 mm. By setting the stroke height to H2 mm, the limit value setting section 111 limits the press speed to A2% or less from the first information in FIG. 4. This press speed A2(%) is a speed corresponding to the maximum SPM (B2%) in the specifications when the stroke height is H2 mm, as illustrated in FIG. 9 described later.

Motion M20 illustrates an example in which the user sets the press speed to A2(%). Therefore, one cycle T20 becomes B2 (SPM) (C2 seconds). In order to make it easier to understand the difference between the motion M20 and the motion M10, the motion M20 and the motion M10 are illustrated with the times of the bottom dead centers of both motions matched.

In the motion M20, the press speed is A2(%) of the motion M10 over the entire cycle.

In this way, the motion creation section 112 creates the motion M20 from the stroke height (for example, H2 mm) and the press speed (for example, A2(%)) input by the user.

As will be described later, the motion creation section 112 also creates a motion in the "moldability priority mode".

(c. Drive Instruction Section 113)

The drive instruction section 113 instructs the servo amplifier 107 to execute the motion created by the motion creation section 112 (for example, the motion M20). The servo amplifier 107 drives the servomotor 7 based on the instruction from the drive instruction section 113.

(d. Effective Load Factor Calculation Section 114)

The effective load factor calculation section 114 calculates the effective load factor of the servomotor 7 when the press working is executed by the motion created by the motion creation section 112. The effective load factor calculation section 114 calculates the effective load factor by acquiring the current value from the servo amplifier 107, integrating the current value for one cycle, and dividing the integrated value by the time of one cycle.

The effective load (torque) in the motion M10 is the hatching region R1 from diagonally upper left to diagonally lower right. Since the motion M10 moves the servomotor 7 at a constant speed, the torque shows a constant value.

On the other hand, the effective load (torque) in the motion M20 is the hatching region R2 from diagonally upper right to diagonally lower left, and the torque changes because acceleration/deceleration of the servomotor 7 occurs. By calculating the effective load factor as described above, the effective load factor calculation section 114 obtains a value corresponding to the average of the absolute values of R2, which is the torque change in one cycle.

As will be described later, the effective load factor calculation section 114 calculates the effective load factor even in the "moldability priority mode".

(e. Effective Load Factor Determination Section 115)

The effective load factor determination section 115 determines that the effective load factor exceeds 100% when the effective load factor calculated by the effective load factor calculation section 114 is larger than a predetermined threshold value (for example, 100% effective load factor (also referred to as continuous rated load factor)) which is stored in the storage section 63. The predetermined threshold value is not limited to 100%, and may be set to a value such as 80% including a margin.

As will be described later, the effective load factor determination section 115 determines whether or not the effective load factor exceeds a predetermined threshold value (for example, 100%) even in the "moldability priority mode".

(f. Second Stop Time Setting Section 116)

The second stop time setting section 116 sets the stop time of the servomotor 7 (also referred to as the stop time for load factor over) when the effective load factor determination section 115 determines that the effective load factor exceeds 100%.

Figure 6A:
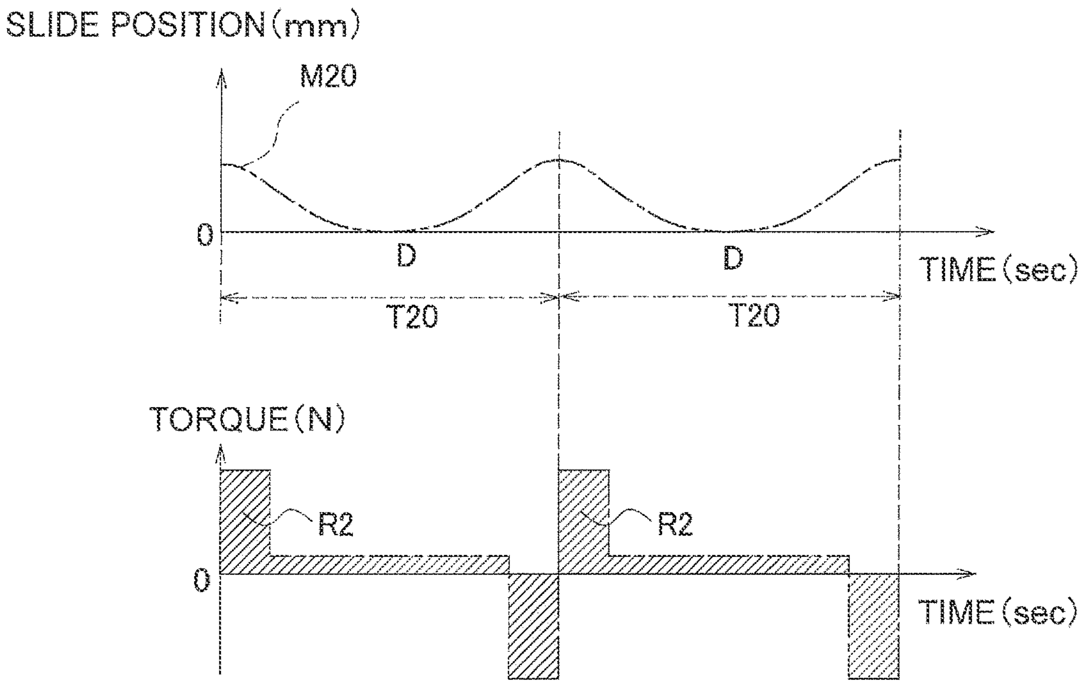
FIG. 6A is a view illustrating a motion after the press speed is set in the productivity priority mode of the pendulum motion, and torque change in the motion.
Figure 6B:
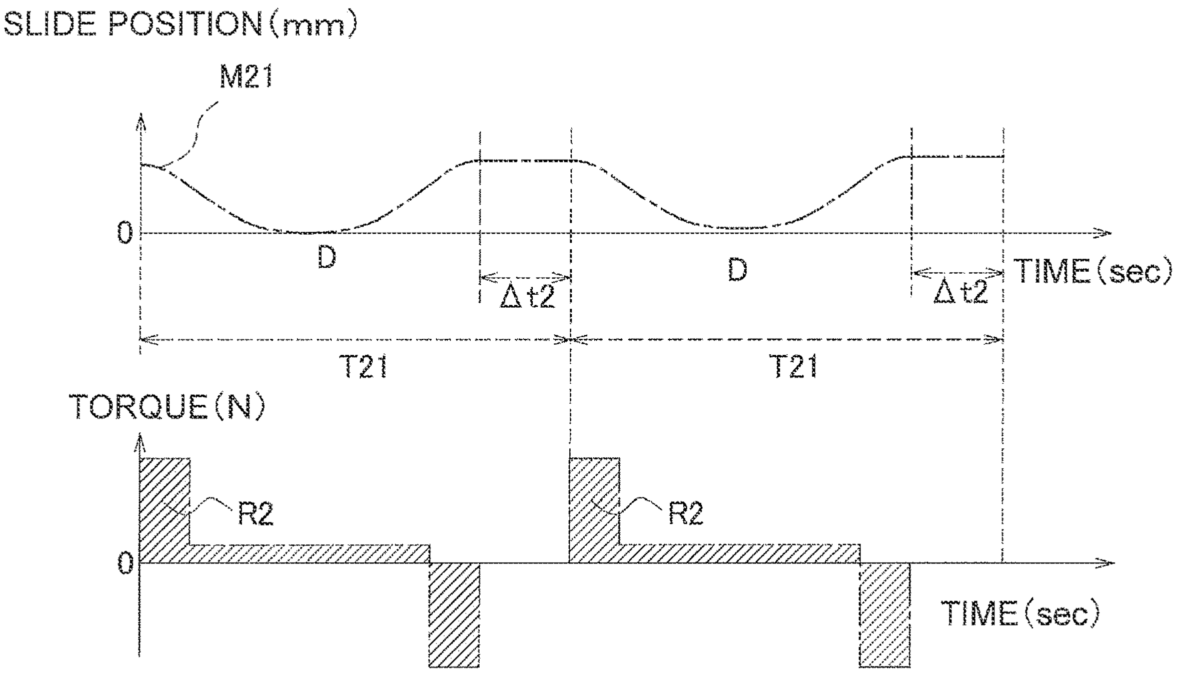
FIG. 6B is a view illustrating a motion in which a stop time is set for the motion of FIG. 6A and a torque change in the motion.

FIG. 6A is a view illustrating a motion M20 after the press speed is set in the productivity priority mode of the pendulum motion and a torque change R2 in the motion M20. Further, FIG. 6B is a view illustrating a motion M21 in which the stop time Δt2 is set in the motion M20 and a torque change R2 in the motion M21.

It is assumed that the cycle time in the motion M20 is T20 and the effective load factor exceeds 100%.

Figure 7A:
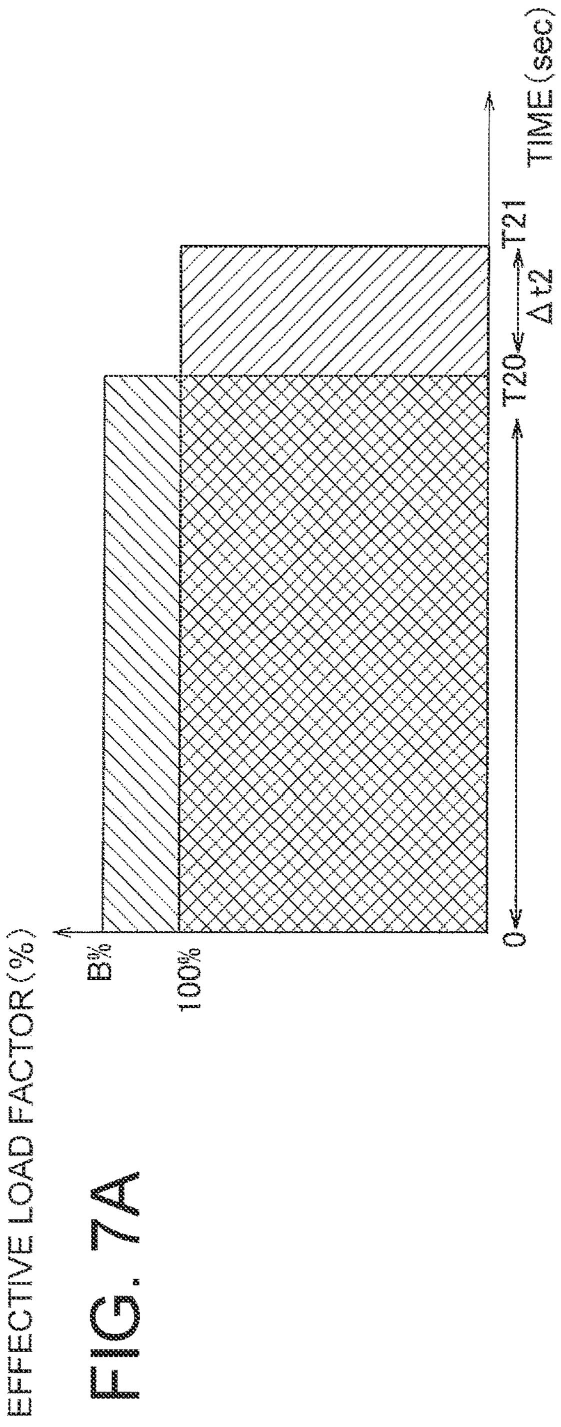
FIGS. 7A and 7B are views for demonstrating a method of calculating the stop time of FIG. 6B.
Figure 7B:
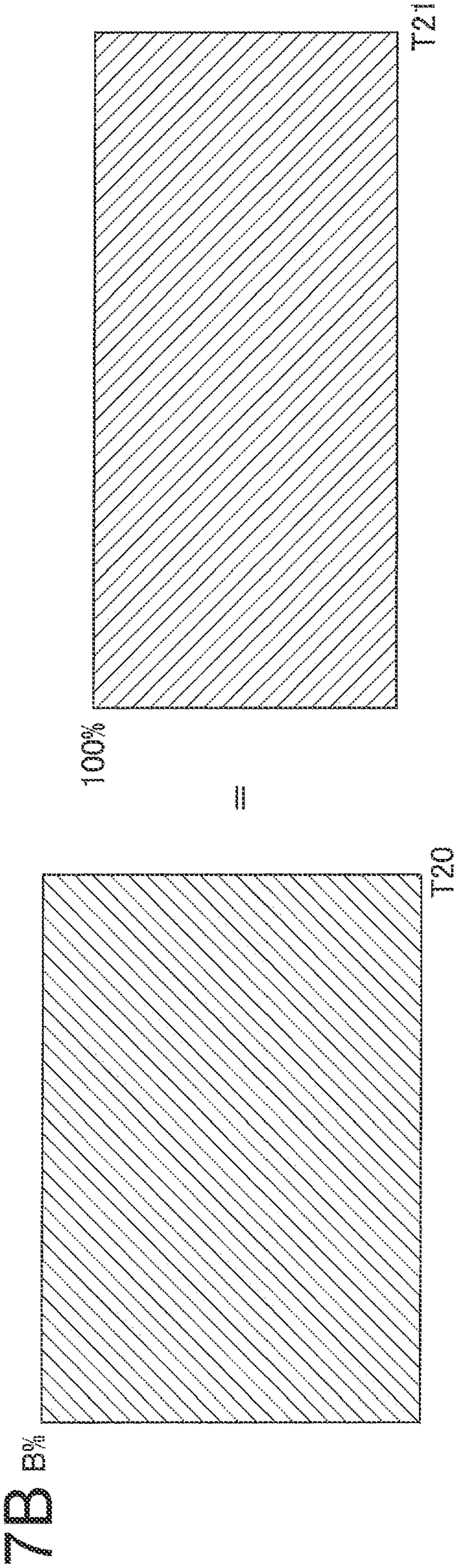

FIGS. 7A and 7B are views for explaining a method of calculating the stop time Δt2 when the effective load factor is 100%. As illustrated in FIG. 7A, when the effective load factor calculated by the effective load factor calculation section 114 is B % (>100%) and the cycle time is T20, the second stop time setting section 116 calculates T21, which is the cycle time when the load factor is 100%. That is, as illustrated in FIG. 7B, since it is sufficient to calculate T21 satisfying B (%)×T20=100(%)×T21, T21 is obtained by the formula of T21=(B/100)×T20. Then, the second stop time setting section 116 can calculate the stop time Δt2 by calculating T21−T20.

When the safety margin is A (%), the stop time Δt2 may be calculated from the cycle time T21 that satisfies B (%)×T20=(100−A) (%)×T21. Therefore, the stop time Δt2 can be calculated by the formula of Δt2=T21−T20={B/(100−A)−1}×T20.

When the stop time Δt2 is calculated, the motion creation section 112 creates a motion including the stop time Δt2. The motion creation section 112 adds the stop time Δt2 calculated by the second stop time setting section 116 to the motion M20 to create the motion M21 illustrated in FIG. 6B.

By adding the stop time of the servomotor 7 to lengthen the cycle time in this way, the effective load factor can be reduced and set to a predetermined threshold value or less.

(g. Processing Speed Measurement Section 117)

When the "moldability priority mode" is selected by the user, a motion is created by the motion creation section 112 based on the stroke height set by the user in the stroke height setting section 103 and the slide speed input by the user in the press speed setting section 104. Based on the created motion, the drive instruction section 113 transmits an instruction to the servo amplifier 107, and press working is executed.

The processing speed measurement section 117 measures the SPM of the press working performed based on the stroke height and the pressing speed input by the user when the "moldability priority mode" is selected. The processing speed measurement section 117 may calculate the SPM from the number of processes for one minute or the number of processes for several minutes, or may measure the cycle time of one cycle to calculate the SPM.

Figure 8:
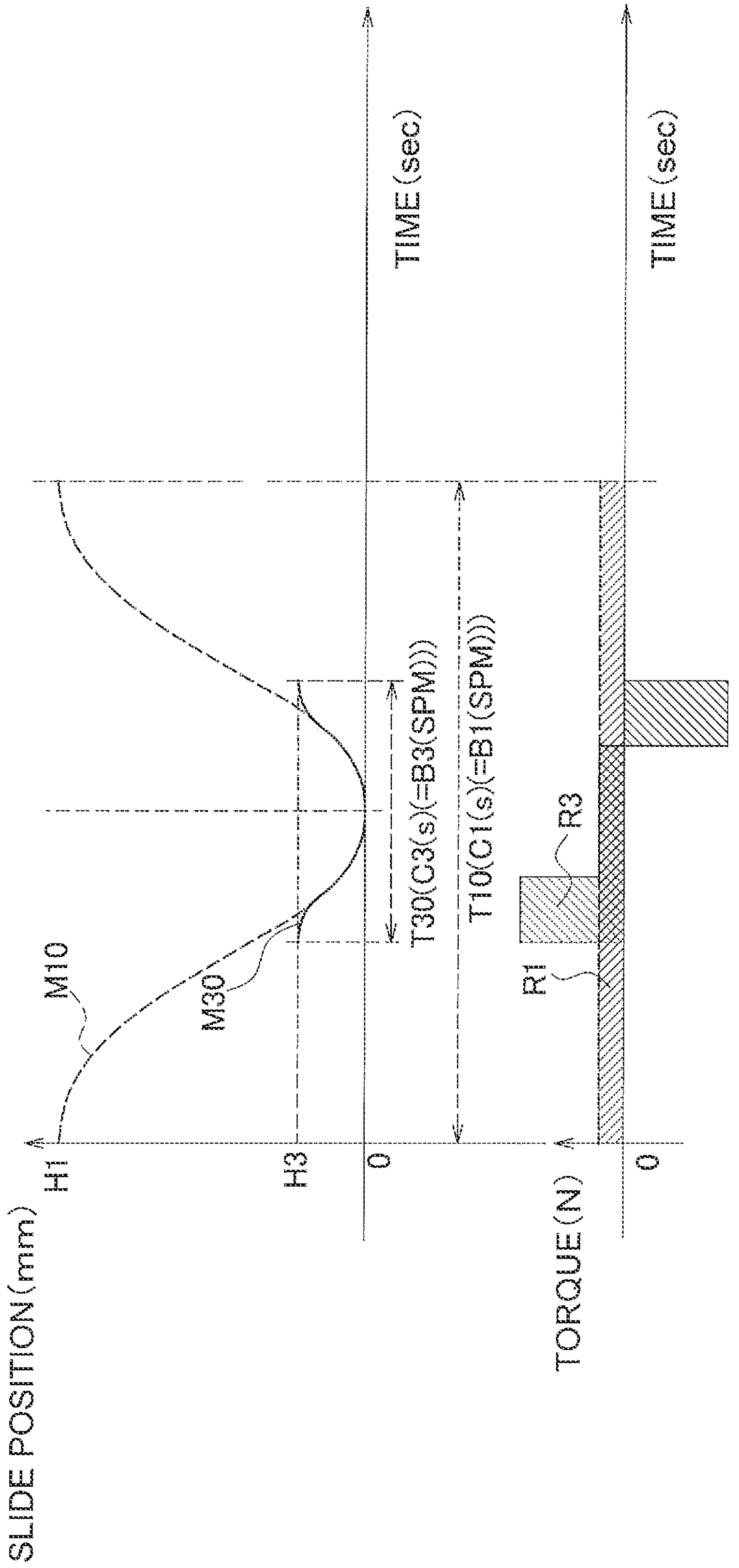
FIG. 8 is a view illustrating a motion which is an example of the rotation motion in the press device of FIG. 1 and a motion in a moldability priority mode in a pendulum motion.

FIG. 8 is a view illustrating a motion M10 which is an example of a rotation motion and a motion M30 in the moldability priority mode in the pendulum motion. FIG. 8 also illustrates the change in torque in one cycle. The motion M10 illustrated in FIG. 8 shows, for example, a rotational motion in B1 (SPM) (1 cycle T10: C1 second) with a stroke height of H1 (mm). The press speed in this rotational motion is 100%. The motion M10 illustrated in FIG. 8 is the same motion as the motion M10 in FIG. 5.

The motion M30 illustrated in FIG. 8 shows, for example, a moldability priority mode in the pendulum motion when the stroke height is set to H3 (mm) (for example, H2=H3 may be used). In the motion M30, the press speed is set to 100% in order to match the press speed of the rotary motion M10. The time T30 of one cycle becomes B3 (SPM) (C3 (seconds)). In order to make it easier to understand the difference between the motion M30 and the motion M10, the motion M30 and the motion M10 are illustrated with the times of the bottom dead centers of both motions matched.

Since the motion M30 matches the press speed of the motion M10, the motion M30 is a movement that matches the motion M10.

The processing speed measurement section 117 executes press working with the motion M30 created when, for example, the stroke height is set to H3 (mm) and the press speed is set to 100%, and measures the SPM at that time, that is, B3 (SPM)).

(h. Processing Speed Determination Section 118)

The processing speed determination section 118 determines whether or not the SPM obtained by the processing speed measurement section 117 is larger than the maximum SPM in the specifications. FIG. 9 is a view illustrating the second information which is the relationship of the limit value of SPM with respect to the stroke height. The second information illustrated in FIG. 9 is stored in the storage section 63.

The processing speed determination section 118 reads the maximum SPM (SPM limit value) at the stroke height set by the stroke height setting section 103 from the second information, and determines whether or not the SPM measured by the processing speed measurement section 117 exceeds the maximum SPM. When it is determined that the SPM does not exceed the maximum SPM, the drive instruction section 113 performs press working in the “moldability priority mode” with the motion created by the motion creation section 112.

The press speed in the first information of FIG. 4 corresponds to the SPM limit in the second information of FIG. 9 with the same stroke height. That is, from FIG. 4, the set value of the press speed when the stroke height is H9 (mm) is limited to A9(%) or less, and the press speed of A9(%) corresponds to the processing speed of B9 (SPM) from the stroke height H9 (mm) in FIG. 9.

(i. First Stop Time Setting Section 119)

The first stop time setting section 119 sets the stop time of the servomotor 7 (also referred to as the stop time for SPM over) when the processing speed determination section 118 determines that the SPM exceeds the maximum SPM. The stop time Δt1 of the servomotor 7 can be obtained by calculating the difference between the actually measured cycle time from the cycle time at the maximum SPM. The cycle time of the maximum SPM can be obtained by calculation because SPM is a processing speed in one minute.

Preferably, the user may provide a margin in which the value can be set. When a margin is provided, the stop time Δt1 can be calculated by (cycle time at the maximum SPM in specification)−(measured cycle time)+(margin).

Figure 10A:
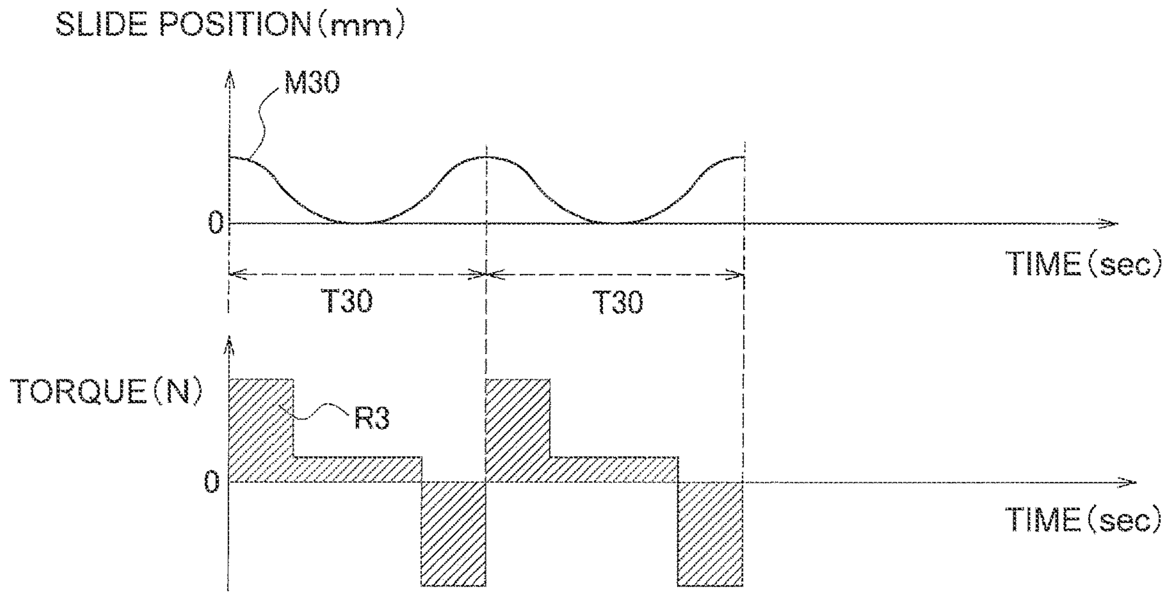
FIG. 10A is a view illustrating a motion and torque change.
Figure 10B:
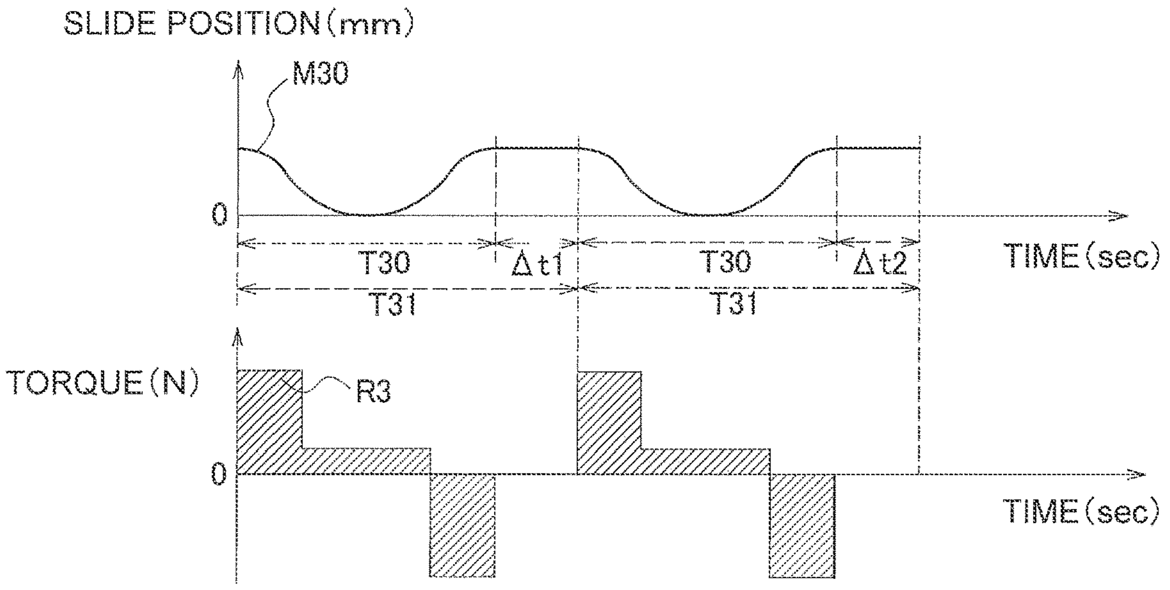
FIG. 10B is a view illustrating a motion which set the stop time to the motion of FIG. 10A, and the torque change.

FIG. 10A is a view illustrating a motion M30 and a torque change R3. FIG. 10B is a view illustrating a motion M31 in which a stop time Δt1 is set and a torque change. As described above, in the “moldability priority mode”, the motion M31 including the stop time Δt1 is created from the motion M30.

(j. Third Stop Time Setting Section 120)

In the “moldability priority mode”, the effective load factor calculation section 114 acquires the current value in the press working executed by the motion M31 and calculates the integrated value of the current value at the cycle time T31. The calculated integrated value is divided by the cycle time T31 to calculate the effective load factor. The effective load factor determination section 115 determines whether or not the calculated effective load factor exceeds 100% (an example of a predetermined threshold value).

When it is determined that the effective load factor exceeds 100%, the third stop time setting section 120 calculates the stop time Δt3 (also referred to as the stop time for load factor over) to be further added to the stop time Δt1. The method of calculating the stop time Δt3 is the same as the method described in the “productivity priority mode” (see FIGS. 7A and 7B).

The third stop time setting section 120 calculates the cycle time T32 at which the effective load factor is 100% or less from the effective load factor and the cycle time T31, calculates the difference between T32 and T31, and obtains the stop time Δt3.

Figure 10C:
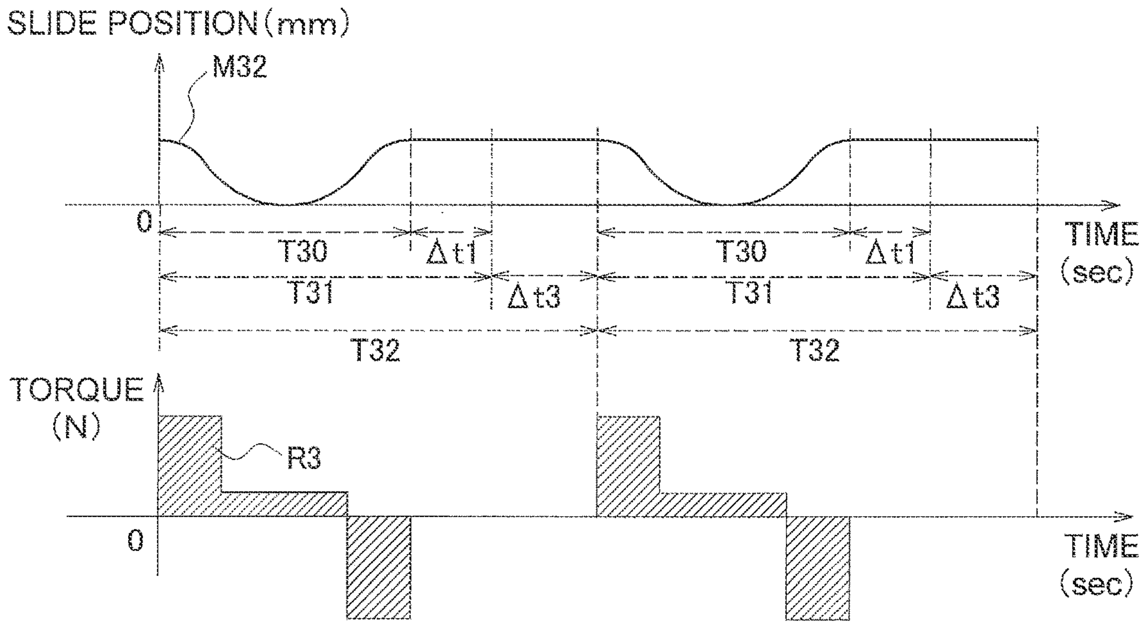
FIG. 10C is a view illustrating a motion which set the stop time to the motion of FIG. 10B, and the torque change.

Then, the motion creation section 112 adds a stop time Δt3 to the motion M31 to create a new motion M32 (see FIG. 10C).

The drive instruction section 113 commands the servo amplifier 107 to execute the created motion M32.

(1-3-3. Storage Section 63)

An HDD, an SDD, a flash memory, or the like can be used as the storage section 63, but the storage section is not particularly limited as long as it can store information. The storage section 63 may be a hard disk, and stores the above-mentioned first information (see FIG. 4), second information (see FIG. 9), the value of the continuous rated load (100% effective load factor), the reference motion, the reference motion and the like. The reference motion is, for example, the above-mentioned rotation motion M10 or the like.

<2. Operation>

Next, a method for controlling the press device according to the embodiment of the present invention will be described.

(2-1. Productivity Priority Mode)

Figure 11:
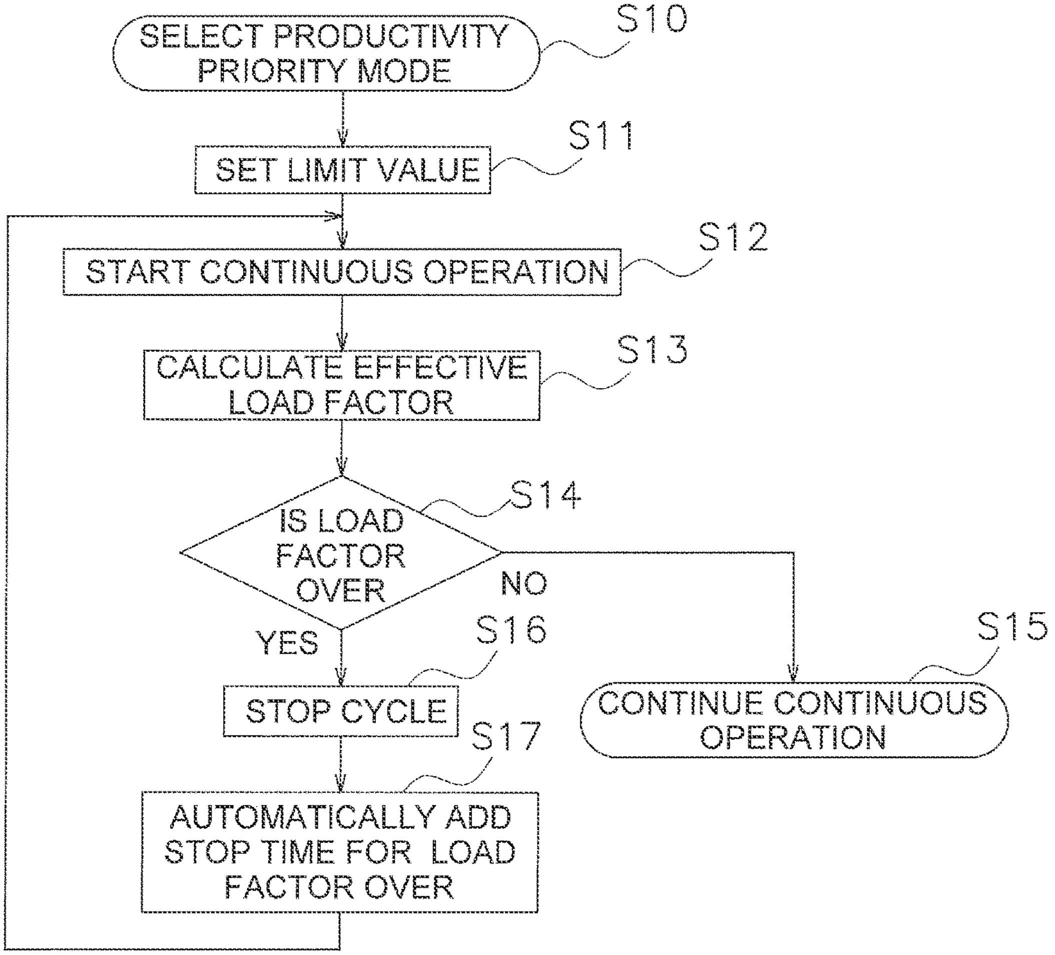
FIG. 11 is a flow chart illustrating control of the press device when the "productivity priority mode" is selected in the pendulum motion of the press device of FIG. 1.

FIG. 11 is a flow chart illustrating the control of the press device 1 when the “productivity priority mode” is selected in the pendulum motion.

In step S10, when the “productivity priority mode” is selected by the user, the user inputs the stroke height in the stroke height setting section 103.

Next, in step S11, the limit value setting section 111 sets a limit on the input value of the press speed from the first information (relationship between the limit of the press speed and the stroke height in the pendulum motion) illustrated in FIG. 4.

When the user inputs the press speed using the press speed setting section 104 and finishes other settings, the motion created by the motion creation section 112 based on the stroke height and the press speed (for example, the motion M20 illustrated in FIG. 6A) is used to start continuous operation in step S12.

Next, in step S13, the effective load factor calculation section 114 calculates the effective load factor in the executed motion. Specifically, the effective load factor calculation section 114 acquires a current value from the servo amplifier 107, integrates the acquired current value for one cycle, and divides the integrated value by the time T20 of one cycle to calculate an effective load factor.

Next, in step S14, the effective load factor determination section 115 determines whether or not the calculated effective load factor exceeds 100% (it can be said that the effective load factor is larger than the rated load factor).

When the effective load factor does not exceed 100%, continuous operation is executed in step S15 in the motion operated in step S12 (for example, motion M20 illustrated in FIG. 6A).

On the other hand, when the effective load factor exceeds 100%, the drive instruction section 113 stops the continuous operation in step S16.

Next, in step S17, the stop time for the load factor over is automatically added to the motion. The second stop time setting section 116 calculates the stop time Δt2 from the effective load factor B % calculated in step S13 and the cycle time T20. Then, the motion creation section 112 adds the stop time Δt2 to the motion M20 operated in step S12 to create a new motion M21.

Next, in step S12, continuous operation is started with a new motion M21 to which a stop time has been added. Then, when the effective load factor is calculated in step S13 and it is determined that the effective load factor does not exceed 100%, continuous operation by the motion M21 is continued in step S15.

(2-2. Moldability Priority Mode)

Figure 12:
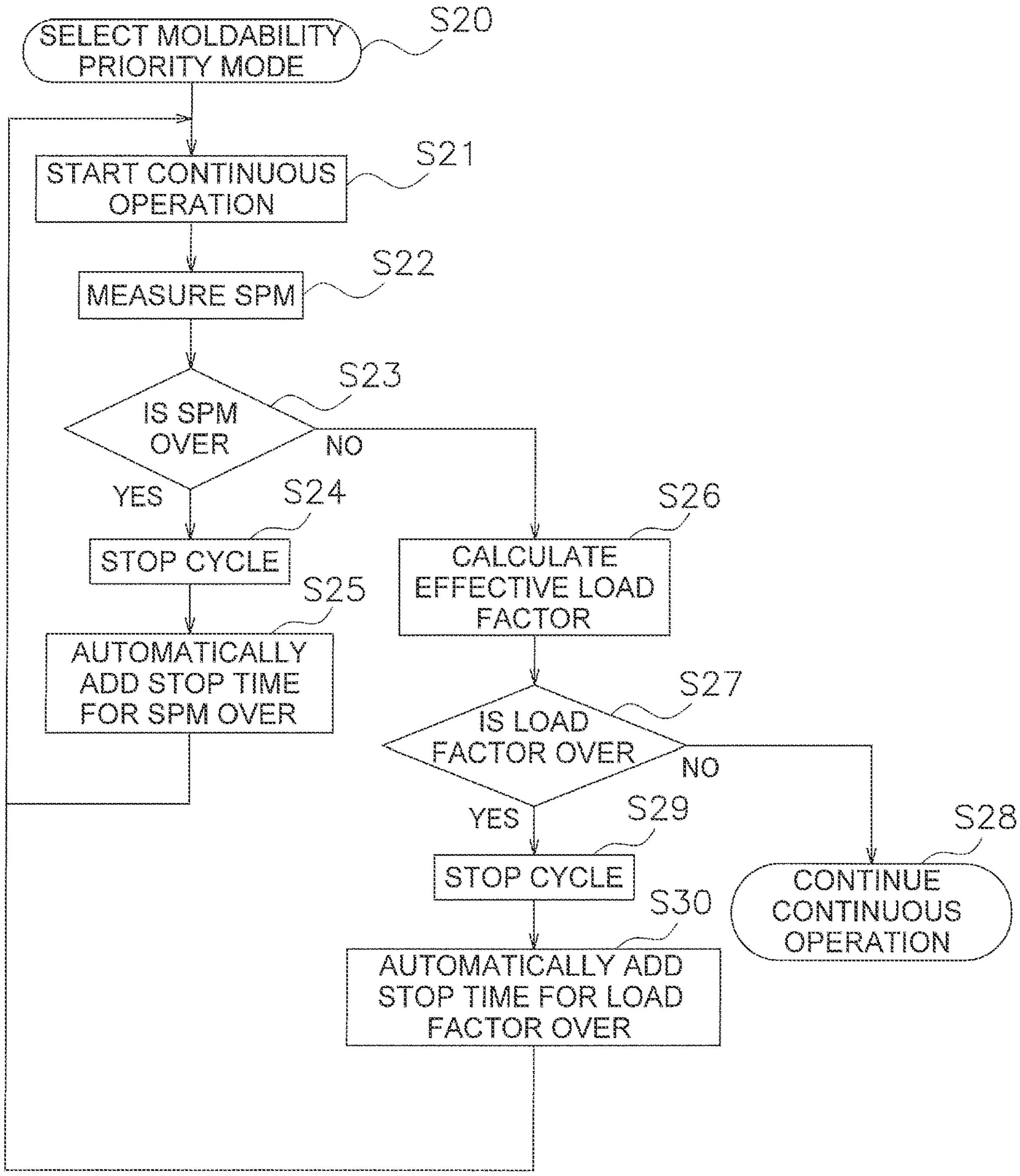
FIG. 12 is a flow chart illustrating control of the press device when the "moldability priority mode" is selected in the pendulum motion of the press device of FIG. 1.

FIG. 12 is a flow chart illustrating the control of the press device 1 when the "moldability priority mode" is selected in the pendulum motion.

In step S20, when the "moldability priority mode" is selected by the user, the user inputs the stroke height in the stroke height setting section 103.

When the user inputs the press speed using the press speed setting section 104 and finishes other settings, the motion created by the motion creation section 112 based on the stroke height and the press speed (for example, the motion M30 illustrated in FIG. 10A) is used to start continuous operation in step S21.

Next, in step S22, the processing speed measurement section 117 measures the SPM in the executed motion.

Next, in step S23, the processing speed determination section 118 determines whether or not the measured SPM exceeds the maximum SPM in the specifications from the second information (maximum SPM in the specifications with respect to the stroke height) in FIG. 9.

When the measured SPM exceeds the maximum SPM in the specifications, the drive instruction section 113 stops continuous operation in step S24.

Next, in step S25, the stop time for SPM over is automatically added to the motion executed in step S21. Explaining with reference to the examples of FIGS. 10A and 10B, the first stop time setting section 119 subtracts the measured cycle time T30 from the cycle time T31 at the maximum SPM in the specification determined by the stroke height set to calculate the stops time Δt1. A margin may be added to the stop time Δt1. Then, the motion creation section 112 creates the motion M31 to which the stop time Δt1 is added.

Next, the control returns to step S21, and continuous operation is started with the newly created motion.

Next, when the SPM is measured in step S21 and it is determined in step S23 that the SPM is not exceeded, the effective load factor in the executed motion (for example, motion M31) is calculated in step S26. Specifically, the effective load factor calculation section 114 acquires a current value from the servo amplifier 107, integrates the acquired current value for one cycle, and divides the integrated value by the time T31 of one cycle to calculate an effective load factor.

Next, in step S27, the effective load factor determination section 115 determines whether or not the calculated effective load factor exceeds 100% (it can be said that the effective load factor is larger than the rated load factor).

When the effective load factor does not exceed 100%, continuous operation is executed in step S28 with the motion operated in step S12 (for example, motion M31 illustrated in FIG. 10B).

On the other hand, when the effective load factor exceeds 100%, the drive instruction section 113 stops the continuous operation in step S29.

Next, in step S30, the stop time for the load factor over is automatically added to the motion. Explaining with reference to FIGS. 10B and 10C, the third stop time setting section 120 calculates the cycle time T32 at which the effective load factor is 100% or less from the effective load factor calculated in step S26 and the cycle time T31, and calculates the difference between T32 and T31 to obtain the stop time Δt3. A margin may be added to the stop time Δt3. Then, the motion creation section 112 adds the stop time Δt3 to the motion M31 operated in step S22 to create a new motion M32.

Next, in step S21, continuous operation is started with a new motion (for example, motion M32) to which the stop time is added. Then, when it is determined in step S23 that the SPM is not exceeded, and when it is determined in step S27 that the effective load factor does not exceed 100%, continuous operation is continued in step S28.

<3. Features>

(3-1)

The press device 1 of the present embodiment is a press device for pressing a work, and includes a slide 3, a bolster 5, a servomotor 7, and a control section 62.

Slide 3 is movable. The bolster 5 is arranged so as to face the slide 3. The servomotor 7 drives the slide 3. The control section 62 can selectively execute either the productivity priority mode (an example of a first mode) of setting a limit value slower than the maximum press speed of the press device to the press speed when performing the pendulum motion or the reverse motion, or the moldability priority mode (an example of a second mode) of setting the stop time (an example of a first stop time) to the servomotor 7 without setting a limit value.

When performing the pendulum motion or the reverse motion, it is possible to selectively execute either the productivity priority mode (an example of a first mode) of setting a limit value to the press speed so as not to exceed the maximum SPM (an example of a maximum processing speed) of the press device 1, or the moldability priority mode (an example of a second mode) of setting the stop time Δt1 (an example of a first stop time) to the servomotor 7 so as not to exceed the maximum SPM.

In this way, when performing the pendulum motion or the reverse motion, it is possible to selectively execute either the productivity priority mode of setting the limit value to the press speed or the moldability priority mode (an example of a second mode) of setting the stop time (an example of a first stop time) to the servomotor 7 without setting a limit value.

In the productivity priority mode, power consumption can be suppressed and energy saving can be achieved by setting the limit value for the press speed. Further, in the moldability priority mode, by setting the stop time Δt1 in the servomotor 7, the operation can be performed within the specification range of the device without exceeding the SPM even when the pendulum motion or the inversion motion is set to follow the rotation motion in order to secure the molding accuracy.

As described above, it is possible to save energy or ensure molding accuracy according to the user's request.

(3-2)

In the press device 1 of the present embodiment, the maximum press speed is the maximum value of the press speed in the case of rotational motion.

As a result, when the pendulum motion or the reverse motion is performed, the maximum value of the press speed in the case of the rotation motion can be prevented from being exceeded.

(3-3)

In the press device 1 of the present embodiment, the limit value and the first stop time are provided so as not to exceed the maximum processing speed of the press device 1.

Thereby, in the moldability priority mode and the productivity priority mode in the pendulum motion or the reversal motion, it is possible to operate the press device 1 so as not to exceed the maximum processing speed of the press device.

(3-4)

In the press device 1 of the present embodiment, the control section 62 sets the stop time Δt2 (an example of a second stop time) in the servomotor so that the effective load factor of the servomotor 7 does not exceed 100% when the effective load factor of the servomotor 7 exceeds 100% (an example of a predetermined threshold value) in the productivity priority mode.

As a result, it is possible to prevent the effective load factor from becoming too large. That is, in the pendulum motion and the reverse motion, it is necessary to accelerate and decelerate the servomotor 7 as compared with the rotational motion, so that the load applied to the amplifier of the servomotor 7 may become too large. However, as in the present embodiment, by setting the stop time Δt2 to the servomotor 7, the effective load factor can be suppressed to 100% or less.

(3-5)

In the press device 1 of the present embodiment, the control section 62 further sets the stop time Δt3 (an example of a third stop time) in the servomotor 7 in addition to the stop time Δt1 (an example of a first stop time) so that the effective load factor of the servomotor 7 does not exceed 100% when the effective load factor of the servomotor 7 exceeds 100% (an example of a predetermined threshold value) in the moldability priority mode.

As a result, it is possible to prevent the effective load factor from becoming too large. That is, in the pendulum motion and the reverse motion, it is necessary to accelerate and decelerate the servomotor 7 as compared with the rotational motion, so that the load applied to the amplifier of the servomotor 7 may become too large. However, as in the present embodiment, by setting the stop time Δt3 to the servomotor 7, the effective load factor can be suppressed to 100% or less.

(3-6)

In the press device 1 of the present embodiment, the limit value of the press speed is set as a ratio to the press speed during the rotational motion.

As a result, the press speed in one cycle can be uniformly limited, so that acceleration/deceleration is reduced, so that power consumption is reduced and the effective load factor can also be reduced.

(3-7)

The press device 1 of the present embodiment further includes a stroke height setting section 103 (an example of a setting section) and a storage section 63. The stroke height setting section 103 can set the stroke height of the slide 3. The storage section 63 stores the first information regarding the limit value of the press speed set for the stroke height. The limit value of the press speed corresponds to the maximum processing speed of the press device 1. In the productivity priority mode, the control section 62 sets the limit value of the press speed based on the first information from the set stroke height.

Thereby, it is possible to calculate the limit value and to limit the press speed.

(3-8)

In the press device 1 of the present embodiment, the limit value is a limit value with respect to the rotation speed of the servomotor, and the press speed is limited by setting the limit value.

Thereby, it is possible to limit the press speed.

(3-9)

The press device 1 of the present embodiment further includes a stroke height setting section 103 (an example of a setting section). The stroke height setting section 103 can set the stroke height of the slide 3. The control section 62 includes a processing speed measurement section 117 and a first stop time setting section 119. The processing speed measurement section 117 measures SPM (an example of processing speed) based on the press working performed at the stroke height which is set in the moldability priority mode. The first stop time setting section 119 sets the stop time Δt1 (an example of a first stop time) based on the measured SPM.

As a result, the processing speed can be kept within the range of the maximum processing speed in the specification of the press device.

(3-10)

The press device 1 of the present embodiment further includes a storage section 63. The control section 62 further includes a processing speed determination section 118 (an example of a determination section). The storage section 63 stores the second information regarding the maximum SPM (an example of a maximum processing speed) of the press device 1 set with respect to the stroke height of the slide 3. The processing speed determination section 118 determines whether or not the processing speed of the press device 1 obtained by operating the press device 1 using the stroke height which is set exceeds the maximum SPM. When the measured SPM exceeds the maximum SPM, the first stop time setting section 119 (an example of a first stop time setting section) sets time to be equal to or greater than the difference between the time T31 of one cycle in the maximum SPM and the time T30 of one cycle in the measured SPM as the stop time Δt1.

As a result, the processing speed can be kept within the range of the maximum processing speed in the specification of the press device.

(3-11)

In the press device 1 of the present embodiment, the control section 62 includes the effective load factor calculation section 114 (an example of a calculation section) and the second stop time setting section 116. In the first mode, the effective load factor calculation section 114 calculates the integrated value of the effective load factor of the servomotor 7 in one cycle time. The second stop time setting section 116 sets time equal to or greater than the difference between the value obtained by dividing the integrated value by a predetermined threshold value and the time of one cycle as the stop time Δt2 (an example of a second stop time).

As a result, it is possible to keep the effective load factor within the threshold value.

(3-12)

In the press device 1 of the present embodiment, the control section 62 includes the effective load factor calculation section 114 (an example of a calculation section) and a third stop time setting section 120. The effective load factor calculation section 114 calculates the integral value of the effective load factor of the servomotor 7 in one cycle time in the moldability priority mode. The third stop time setting section 120 sets time equal to or greater than the difference between the value obtained by dividing the integrated value by a predetermined threshold value and the time of one cycle as the stop time Δt3 (an example of a third stop time).

As a result, it is possible to keep the effective load factor within the threshold value.

(3-13)

The method for controlling the press device 1 of the present embodiment is a method for controlling the press device 1 in which the slide 3 is driven by the servomotor 7, includes the steps S10, S11, and S20, S21, S22, S23, S24, S25 (an example of a control step). The control steps can selectively execute either the productivity priority mode (an example of a first mode) of setting a limit value slower than the maximum press speed of the press device to the press speed when performing the pendulum motion or the reverse motion, or the moldability priority mode (an example of a second mode) of setting the stop time (an example of a first stop time) to the servomotor 7 without setting a limit value.

In the productivity priority mode, power consumption can be suppressed and energy saving can be achieved by setting a limit value for the press speed. Further, in the moldability priority mode, by setting the stop time in the servomotor 7, the operation can be performed within the specification range of the device without exceeding the SPM even when the pendulum motion or the reverse motion is set to follow the rotational motion in order to secure the molding accuracy.

As described above, it is possible to save energy or ensure molding accuracy according to the user's request.

OTHER EMBODIMENTS

Embodiments of the present invention were described above, but the present invention is not limited to or by the above embodiments, and various modifications are possible without departing from the gist of the invention.

(A)

In the above embodiment, in the moldability priority mode, the effective load factor is calculated after setting the maximum SPM or less, but both the stop time for SPM over and the stop time for load factor over may be calculated at the same time. For example, in the "moldability priority mode", the effective load factor calculation section 114 acquires the current value in the press working executed by the motion M30 and calculates the integrated value of the current value at the cycle time T30. By dividing the calculated integrated value by the time obtained by adding Δt1 to the cycle time T30 in the motion M30, it is possible to calculate the effective load factor when it is assumed that the press working is executed in the motion M31. Then, the effective load factor determination section 115 determines whether or not the calculated effective load factor exceeds 100%.

When it is determined that the effective load factor exceeds 100%, the third stop time setting section 120 calculates the stop time Δt3 further added to the stop time Δt1.

(B)

In the press device 1 of the above embodiment, the connecting rod 9 is directly attached to the slide 3, but a plunger may be provided between the slide 3 and the connecting rod 9.

Further, the press device 1 of the above-described embodiment is provided with one point, but may be provided with two or more points.

(C)

In the press device 1 of the above embodiment, the control device 6 is integrally provided, but the control device may be provided at a position different from that of the press device main body.

Figure 13:
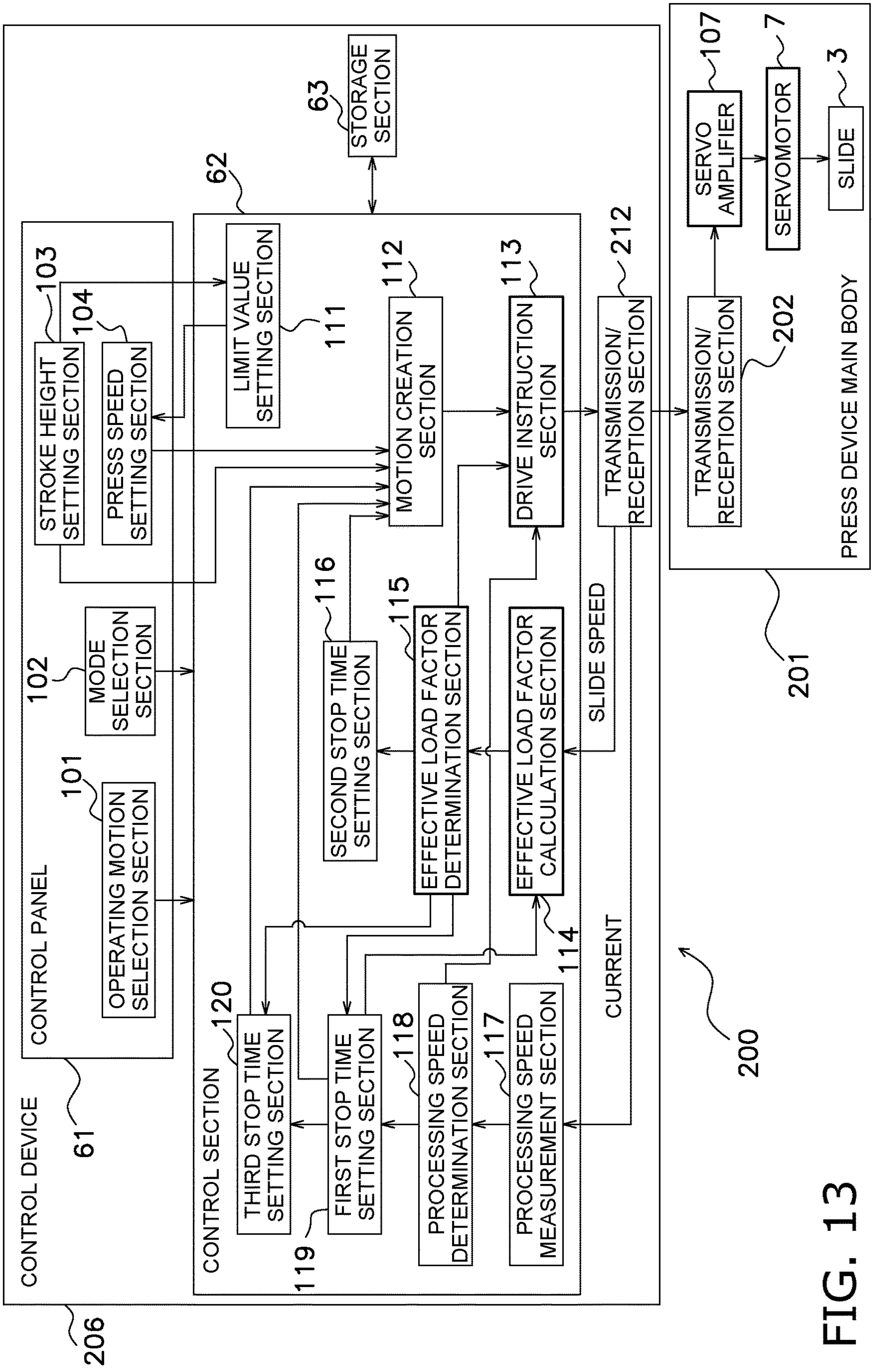
FIG. 13 is a view illustrating a configuration of a press system which is a modification of the embodiment according to the present invention.

FIG. 13 is a configuration view illustrating a press system 200 including a control device 206 and a press device main body 201. Compared to the press device 1, the press device main body 201 illustrated in FIG. 13 does not include the control device 6, but includes a transmission/reception section 202 for transmitting/receiving data. Further, the control device 206 is separate from the press device main body 201 as compared with the control device 6, and includes a transmission/reception section 212. The press device main body 210 and the control device 206 transmit and receive data via the transmission/reception section 202 and the transmission/reception section 212. Data can be transmitted and received wirelessly or by wire. Further, data may be moved between the press device main body 210 and the control device 206 by inserting and removing the memory card. Further, the control device 6 can be realized by using, for example, a personal computer or the like.

(D)

Figure 14:
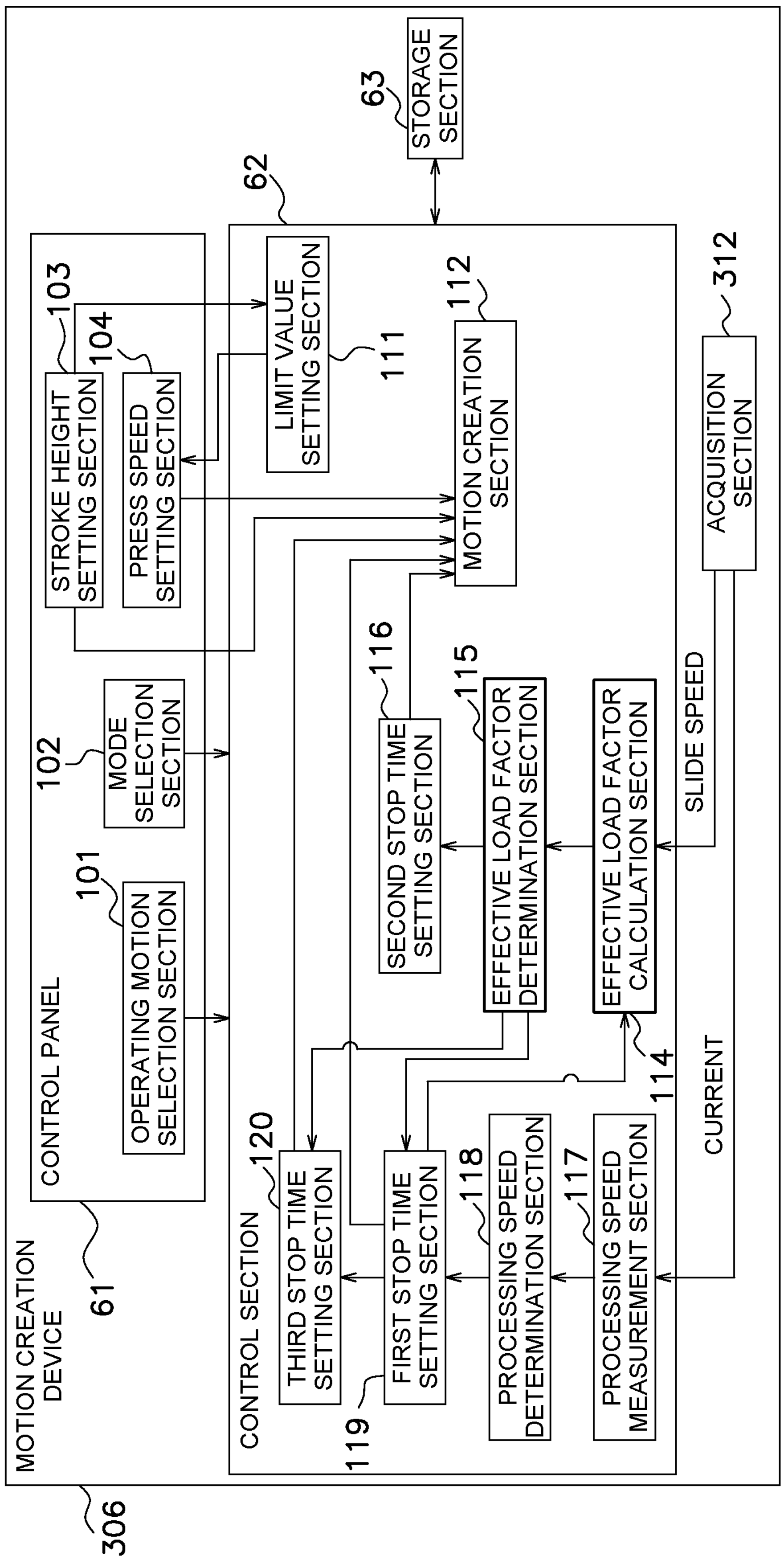
FIG. 14 is a view illustrating a configuration of a motion creation device which is a modification of the embodiment according to the present invention.

The control device 6 of the above embodiment may be used as a motion creation device. FIG. 14 is a view illustrating the configuration of the motion creation device 306. Unlike the control device 6, the motion creation device 306 does not have the drive instruction section 113, but has the acquisition section 312 for acquiring the data of the result of the press working executed by the press device. The data of the result of press working includes data necessary for calculating SPM (cycle time and the like) and data necessary for calculating the effective load factor (current value and the like).

The acquisition section 312 may be a reader of a memory card, or may be connected to a press device via a wire or wirelessly.

(E)

In the above embodiment, the first information, the second information, the threshold value of the effective load factor, the reference rotation motion, and the like are stored in the same storage section 63, but they may be stored separately.

(F)

The effective load factor calculation section 114 calculates the effective load factor in both the moldability priority mode and the productivity priority mode, but the effective load factor calculation section for each of the moldability priority mode and the productivity priority mode may be provided separately.

(G)

In the above embodiment, it is described that the rotation angle is set by setting the stroke height in the stroke height setting section 103, but a press angle setting section in which the press angle (standby angle) is set may be provided in addition to the stroke height setting section 103. In this case, when either the stroke height or the standby angle is set by the stroke height setting section 103 or the press angle setting section, the other is automatically converted and set. Further, a press angle setting section may be provided instead of the stroke height setting section 103. In short, all that is required is to be able to set a numerical value that determines the stroke height. The stroke height of the present invention includes not only the stroke height itself but also a numerical value (for example, a press angle (standby angle)) that determines the stroke height.

(H)

In the above embodiment, two modes, "moldability priority mode" and "productivity priority mode", are provided in the pendulum motion or the inversion motion, but the present invention is not limited to the two modes and other modes may be provided.

(I)

The program of the present invention is a program in which the operation of all or a part of the steps of the method for controlling the press device of the present invention described in the flow charts of FIGS. 11 and 12 described above is executed by the computer, and is a program that operates in cooperation with a computer.

One usage mode of the program of the present invention may be a mode in which the program is recorded in a storage medium such as a ROM that can be read by a computer and operates in cooperation with the computer.

Further, one usage mode of the program of the present invention may be a mode in which the program is transmitted in a transmission medium such as the Internet or a transmission medium such as optical/radio waves, is read by a computer, and operates in cooperation with the computer.

Further, the computer of the present invention described above is not limited to pure hardware such as a CPU, and may include firmware, an OS, and peripheral devices. Further, the configuration of the present invention may be realized by software or hardware.

According to the present invention, it is possible to provide a press device, a press system, a method for controlling the press device, a program, and a motion creation device capable of saving energy or ensuring molding accuracy according to a user's request.

The invention claimed is:

1. A press device for pressing a workpiece, comprising:

a slide configured to be movable;

a bolster placed facing the slide;

a servomotor configured to drive the slide; and a control device including a processor and a storage, the control device being configured to execute selectively between a first mode of setting a limit value of a press speed when performing a Pendulum motion or a reverse motion, the limit value being slower than a maximum press speed of the press device, and a second mode of setting a first stop time to the servomotor without setting the limit value.

2. The press device according to claim 1, wherein the maximum press speed is a maximum value of the press speed during a rotational motion.

3. The press device according to claim 1, wherein the limit value and the first stop time are set so as not to exceed a maximum processing speed of the press device.

4. The press device according to claim 1, wherein in the first mode, when an effective load factor of the servomotor exceeds a predetermined threshold value, the control device is configured to set a second stop time to the servomotor so as not to exceed the predetermined threshold value.

5. The press device according to claim 1, wherein in the second mode, when an effective load factor of the servomotor exceeds a predetermined threshold value, the control device is configured to set a third stop time to the servomotor in addition to the first stop time so as not to exceed the predetermined threshold value.

6. The press device according to claim 1, wherein the limit value of the press device is set as a ratio to the press speed during a rotational motion.

7. The press device according to claim 1, wherein the control device is further configured to set a stroke height of the slide, and store first information regarding the limit value of the press speed set with respect to the stroke height, and set the limit value of the press speed based on the first information from the stroke height which is set in the first mode, the limit value of the press speed corresponding to a maximum processing speed of the press device.

8. The press device according to claim 1, wherein the limit value is a limit value with respect to a rotation speed of the servomotor, and the press speed is limited by setting the limit value.

9. The press device according to claim 1, wherein the control device is further configured to set a stroke height of the slide, measure a processing speed based on a press working performed at the stroke height which is set in the second mode, and set the first stop time based on the processing speed which is measured.

10. The press device according to claim 9, wherein the control device is further configured to store second information regarding a maximum processing speed of the press device set with respect to the stroke height of the slide, determine whether or not a processing speed of the press device obtained by operating the press device using the stroke height which is set exceeds the maximum processing speed, and upon determining that the processing speed exceeds the maximum processing speed, set a time equal to or greater than a difference between a time of one cycle at the maximum processing speed and a time of one cycle at the processing speed as the first stop time.

11. The press device according to claim 4, wherein the control device is further configured to calculate an integrated value of the effective load factor of the servomotor for one cycle time in the first mode, and set a time equal to or greater than a difference between a value obtained by dividing the integrated value by the predetermined threshold value and a time of the one cycle as the second stop time.

12. The press device according to claim 5, wherein the control device is further configured to calculate an integrated value of the effective load factor of the servomotor for one cycle time in the second mode, and set a time equal to or greater than a difference between a value obtained by dividing the integrated value by the predetermined threshold value and a time of the one cycle as the third stop time.

13. A press system comprising:

a press device main body including a slide configured to be movable, a bolster placed facing the slide, and a servomotor configured to drive the slide; and a control device configured to selectively cause the press device main body to execute selectively between a first mode of setting a limit value of a press speed when performing a pendulum motion or a reverse motion, the limit value being slower than a maximum press speed of the press device main body, and a second mode of setting a first stop time to the servomotor without setting the limit value.

* * * * *